United States Patent Office 3,190,901
Patented June 22, 1965

3,190,901
LINEAR POLYMERS OF ALKYLENE TIN CHLORIDES
Rudolf Polster, Frankenthal, Pfalz, Germany, assignor to Badische Anilin- & Soda-Fabrik Aktiengesellschaft, Ludwigshafen (Rhine), Germany
No Drawing. Filed May 29, 1962, Ser. No. 198,450
Claims priority, application Germany, June 8, 1961, B 62,819
6 Claims. (Cl. 260—429.7)

This invention relates to new linear polymers of alkylene tin chlorides and a process for their manufacture. The new polymeric compounds are suitable both for the manufacture of stabilizers for plastics and as polymerization catalysts.

It is well known that on reacting tetraalkyl tin compounds with tin tetrahalides, good yields of alkyl tin halides can be obtained (cf. U.S. Patents 2,569,429; 2,570,686; 2,599,557; and 2,672,471; J. Chem. Soc. 1446 (1947); Ber. 62, 996 (1929); Ber. 67, 717, 1348 (1934).

The object of this invention is new linear polymers of alkylene tin chlorides in which the chains contain from two to sixty units of the grouping

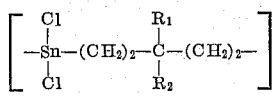

in which $R_1$ and $R_2$ are hydrogen, methyl or ethyl. In practice this invention is achieved by reacting cyclic alkylene tin compounds with the general formula

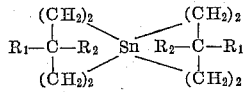

in which $R_1$ and $R_2$ are hydrogen, methyl or ethyl with tin tetrachloride.

Bis-(3,3-dimethylpentylene-)tin and bis-(3-methyl-3-ethylpentylene-)tin are, for example, suitable cyclic alkylene tin compounds. The reaction can be carried out in a simple manner by bringing the two components together at room temperature preferably in molar proportions of 1:2 to 2:1. If the molar ratio employed is about 1:1, polymers with particularly high molecular weights are obtained. If the molar ratio is larger or smaller, the resultant molar weights are low.

The reaction is feasibly carried out away from water, though traces of water do not interfere.

As a rule, the reaction is carried out at temperatures lying between 20° and 250° C. In order to facilitate removal of the heat of reaction, it is of advantage to add either an aliphatic hydrocarbon, such as hexane or heptane, or an aromatic hydrocarbon, such as benzene or toluene. In order to bring the reaction to completion it is often advantageous further to heat the reaction mixture up to from 100° to 250° C., but this is not necessary in every case.

The cyclic alkylene tin compounds can be manufactured by the method according to my copending U.S. patent application, Serial No. 142,517, filed October 3, 1961, now U.S. Patent No. 3,098,088, granted July 16, 1963.

The new linear polymers of alkylene tin chlorides have a solid or oily consistency and are characterized by their low solubility in hydrocarbons and by their low vapor pressure. Their chlorine content is approximately the same as that of the tin tetrachloride used in the process of this invention. If the molecular weight of a polymer prepared in accordance with this invention exceeds an approximate value of 3000, the product is insoluble in hydrocarbons and conventional solvents.

The compounds obtained are valuable intermediate products in the manufacture of stabilizers for plastics and of catalysts used in the polymerization of olefines and isocyanates.

The parts given in the examples are parts by weight.

Example 1

47 parts bis-(3,3-dimethylpentylene-)tin are dissolved in 80 parts dry benzene and 19.5 parts tin tetrachloride are added dropwise at 30° C. The solution is brought to the boil, the solvent distilled off and the residue heated to 230° C. for 30 minutes. 65 parts of a viscous, yellow-colored oil, which contains 11.5 percent by weight chlorine, are obtained. Its molecular weight is 920.

Example 2

47 parts bis-(3,3-dimethylpentylene-)tin are added dropwise, with good stirring, to 78 parts tin tetrachloride; the temperature is not allowed to exceed 60° C. After cooling to room temperature the residue is caused to crystallize completely by rubbing, 125 parts of an almost colorless, crystalline product being obtained which becomes pure-white upon washing with cold dry petroleum ether. It has a melting point of 83° to 85° C., a chlorine content of 37.6 percent weight and a molecular weight of 842.

Example 3

50.4 parts bis-(3,3-dimethylpentylene-)tin are dissolved in 60 parts dry benzene, and a solution of 41.6 parts tin tetrachloride in 40 parts benzene is added dropwise with stirring; the temperature being kept below 80° C. The mixture is refluxed for 1 hour. The benzene is distilled off and the residue heated to 230° C. for 1 hour. After cooling the resultant solid, vitreous residue is comminuted and then boiled with benzene.

56 parts of a solid, colorless compound are obtained. The compound has a melting point of 196° to 201° C., a chlorine content of 25.2 percent, and a molecular weight of 2,200.

Example 4

13.5 parts tin tetrachloride are added dropwise, with stirring, to 16.4 parts bis-(3,3-dimethylpentylene-)tin, the temperature being maintained below 80° C. The reaction mixture is then heated for 30 minutes at 230° C. After cooling, the completely solid, vitreous residue is comminuted, and then boiled with benzene. 25 parts of a solid, colorless product with a chlorine content of 24.6 percent, are obtained of which 11 parts are soluble in alcohol and dimethyl formamide. The intrinsic viscosity, ($\eta$) of these 11 parts, as measured at 30° C. in dimethyl formamide, is 0.1. The remaining 14 parts are not soluble in any of the normally used solvents, such as benzene, tetrahydrofuran or dimethyl formamide.

Example 5

92.5 parts thioglycollic acid ethylhexyl ester are dissolved in 454 parts by volume of a 1 N-solution of sodium methylate in methanol. To this is added a solution of 65.3 parts of polymerized 3,3-dimethylpentylene tin dichloride in 1,000 parts by volume of ethanol. A white precipitate is obtained. The alcohol is decanted off, the white residue dissolved in benzene, and the insoluble residue centrifuged. The benzene solution is evaporated off. The product, polymeric tin dimethylpentylene dithioglycollic acid ethylhexyl ester, is dried at 100° C. in vacuo. The yield is 134 parts.

100 parts of a polyvinyl chloride of K-value 70 and prepared by suspension polymerization, are intimately mixed with 1 part of the polymeric tin dimethylpentylene dithioglycollic acid ethylhexyl ester which has a molecular weight of 4,000.

The mixture is milled for 5 minutes at 150° C. and then pressed into glass-clear, colorless plates, 1 mm. thick. Samples of these plates are placed in a chamber heated to 170° C., and then examined every 30 minutes. The specimens continue to show no discoloration after 90 minutes, whilst non-stabilized polyvinyl chloride discolors during milling, and specimens of polyvinyl chloride stabilized with lead and tin stearate are discolored after 30 minutes.

What I claim is:

1. Linear polymers of alkylene tin chlorides which consist essentially of two to sixty recurring units of the grouping

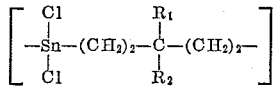

in which $R_1$ and $R_2$ denote members selected from the group consisting of hydrogen, methyl and ethyl.

2. Linear polymers of alkylene tin chlorides in accordance with claim 1, in which $R_1$ and $R_2$ are ethyl.

3. Linear polymers of alkylene tin chlorides in accordance with claim 1, in which $R_1$ and $R_2$ are methyl.

4. A process for the manufacture of linear polymers of alkylene tin chlorides which comprises: heating at temperatures of between 20° and 250° C. cyclic alkylene tin compounds of the general formula

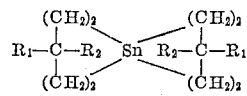

in which $R_1$ and $R_2$ are members selected from the group consisting of hydrogen, methyl and ethyl, together with tin tetrachloride in a molar ratio ranging between 1:2 and 2:1.

5. The process as claimed in claim 4, wherein bis-(3,3-dimethylpentylene-)tin is reacted with tin tetrachloride.

6. The process as claimed in claim 4, wherein bis-(3-methyl-3-ethylpentylene-)tin is reacted with tin tetrachloride.

References Cited by the Examiner

UNITED STATES PATENTS 2,775,563   12/56   Wiezer _____ 260—2

OTHER REFERENCES

Chem. Abstracts, vol. 45 (1950), pp. 2856–57.

Crain et al., WADC Technical Report 59–427, Jan. 1960, p. 19, 1959.

MURRAY TILLMAN, *Primary Examiner.*

J. R. LIBERMAN, *Examiner.*